US00RE35142E

United States Patent [19]

Kikuchi et al.

[11] E Patent Number: Re. 35,142

[45] Reissued Date of Patent: Jan. 9, 1996

[54] FLUORESCENT LAMP HAVING THREE ELECTRODES FOR STARTING AT LOW TEMPERATURES

[75] Inventors: Ryoji Kikuchi; Shinyu Ikeda; Masataka Nishiyama, all of Tokyo, Japan

[73] Assignee: Asahi Kogaku Kogyo Kabushiki Kaisha, Tokyo, Japan

[21] Appl. No.: 205,241

[22] Filed: Jan. 13, 1994

Related U.S. Patent Documents

Reissue of:

[64] Patent No.: 5,081,395
Issued: Jan. 14, 1992
Appl. No.: 368,512
Filed: Jun. 20, 1989

[30] Foreign Application Priority Data

Jun. 20, 1988 [JP] Japan ..... 63-82246 U

[51] Int. Cl.[6] ..... H01J 5/46; H01J 61/54; H01J 65/00

[52] U.S. Cl. ..... 313/594; 313/234; 313/488; 313/596

[58] Field of Search ..... 313/488, 489, 313/594, 234, 492, 596, 607

[56] References Cited

U.S. PATENT DOCUMENTS 2,491,854 12/1949 Force ..... 313/594
4,700,101 10/1987 Ellner et al. ..... 313/493
5,189,340 2/1993 Ikeda .

FOREIGN PATENT DOCUMENTS 53-87589 8/1978 Japan .
58-193560 12/1983 Japan .
61-190658 11/1986 Japan .
1594901 8/1981 United Kingdom .
2082833 3/1982 United Kingdom .

OTHER PUBLICATIONS

"Xenon Fluorescent Lamp for Office Automation Equipment—NEC Home Electronics", published in Nikkei Mechanical dated Oct. 19, 1992.

*Primary Examiner*—Brian Zimmerman
*Attorney, Agent, or Firm*—Sandler, Greenblum, & Bernstein

[57] ABSTRACT

A fluorescent lamp having an improved starting performance, especially at low temperatures. A gas under a low pressure is sealed in a glass tube having a pair of electrodes mounted thereon, and a fluorescent material is coated on the inner surface of the glass tube, the fluorescent material being activated to emit light by a discharge between the pair of electrodes. A third electrode is provided between the pair of electrodes, the third electrode being connected to one of the pair of electrodes.

13 Claims, 1 Drawing Sheet

FLUORESCENT LAMP HAVING THREE ELECTRODES FOR STARTING AT LOW TEMPERATURES

Matter enclosed in heavy brackets [ ] appears in the original patent but forms no part of this reissue specification; matter printed in italics indicates the additions made by reissue.

BACKGROUND OF THE INVENTION

The present invention relates to a fluorescent lamp, and more particularly to an improved electrode structure for a fluorescent lamp.

Conventionally, in an electronic copying machine in which image information including figures and/or characters is duplicated on a recording paper by electrophotography, and also in an image processing device such as an image scanner in which the surface of an original is optically scanned so as to convert the image on the original into an electrical signal, a strong light source for illuminating the surface of the original is needed. For this purpose, there has been used a light source such as a fluorescent lamp in which a fluorescent material is activated in such a manner as to cause it to emit light.

Such a fluorescent lamp includes a pair of electrodes mounted at respective opposite ends of a glass tube in opposed relation to each other. Mercury vapor or the like under a low pressure is sealed in the glass tube, and a fluorescent material is coated on the inner surface of the tube. The fluorescent material is not coated on part of the inner surface of the glass tube so as to provide a non-coated region of a predetermined width which extends longitudinally of the glass tube in a slit-like manner to form a light-applying aperture A strong light output can be obtained through this aperture The above conventional fluorescent lamp suffers from a drawback, however, in that its starting ability (i.e., the ability of being turned on) is inferior in a low-temperature environment, particularly around 0° C.

More specifically, when the fluorescent lamp is at a temperature around 0° C., the mercury in the glass tube tends to liquefy, and therefore even when a predetermined voltage is applied between the electrodes, it is difficult to obtain a proper discharge. As a result, the fluorescent lamp is not immediately lit or turned on.

To deal with this problem, various measures have been taken. One example is to increase the voltage applied between the electrodes, and another is to mount a heater around the glass tube for pre-heating purposes. However, the former is not satisfactory from the viewpoint of compactness of the lamp since the capacity of the power source must be increased. The latter is also unsatisfactory because a warm-up time is required when turning on the lamp. Also, a space for the installation of the heater must be provided, and the electric power consumption is increased.

SUMMARY OF THE INVENTION

With the above deficiencies of the prior art in view, it is an object of the invention to provide an improved fluorescent lamp which can be easily and quickly turned on even in a low-temperature environment, thus providing an improved starting.

The above object has been achieved by a fluorescent lamp wherein a gas under a low pressure is sealed in a glass tube having a pair of electrodes mounted thereon, a fluorescent material is coated on the inner surface of the glass tube, the fluorescent material being activated to emit light by a discharge between the pair of electrodes, and wherein a third electrode is provided between the pair of electrodes, the third electrode being connected to one of the pair of electrodes.

With the above constriction, the distance between the pair of electrodes is reduced by the third electrode, and therefore the starting ability of the lamp is improved at low temperatures without having to increase the voltage applied between the electrodes.

DESCRIPTION OF THE PREFERRED EMBODIMENTS

A preferred embodiment of the invention will now be described with reference to the drawings.

Figure 1:
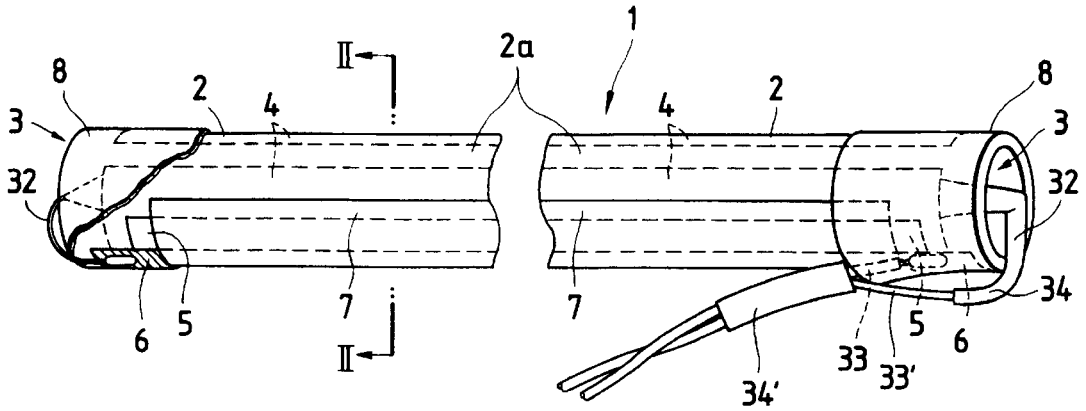
FIG. 1 is a schematic perspective view of a fluorescent lamp constructed according to a preferred embodiment of the present invention.
Figure 2:
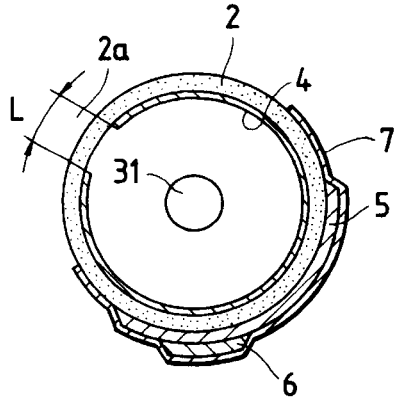
FIG. 2 is a cross-sectional view of the fluorescent lamp taken along a line II—II in FIG. 1.

FIG. 1 a schematic perspective view of a fluorescent lamp of the present invention. FIG. 2 is a cross sectional view of the lamp taken along a line II—II in FIG. 1.

The fluorescent lamp 1 includes a glass tube 2 of a cylindrical shape, and electrode portions 3 mounted on respective opposite ends of the glass tube 2 in opposed relation to each other. A light-applying aperture 2a extends in the longitudinal direction of the glass tube 2 through which a strong light output can be obtained.

Mercury vapor or the like under a low pressure is sealed in the glass tube 2. A fluorescent material is coated on the inner surface of the glass tube 2 to form a fluorescent layer or film 4. The fluorescent material is nor coated on part of the inner surface of the glass tube 2 so as to leave a non-coated region of a predetermined width L extending in a slit-like manner in the longitudinal direction of the glass tube 2. This non-coated region constitutes the light-applying aperture 2a.

The electrode portion 3 is composed of an electrode 31 sealed in the glass tube 2. An electrode wire 32 connected to the electrode 31 extends to the exterior from the sealed end of the glass tube 2. The two electrode portions 3 are provided respectively at the opposite ends of the glass tube 2 to constitute the pair of opposed electrodes.

An arcuate-plate electrode, which conforms in cross-section to the outer peripheral surface of the glass tube 2 and is composed of an aluminum foil or leaf 5 and a copper foil or leaf 6, is formed on the outer peripheral surface of the glass tube 2. This arcuate-plate electrode is hereinafter referred to as a third electrode.

More specifically, the aluminum foil 5, having a predetermined width and length, is bonded to a portion of the outer peripheral surface of the glass tube 2 in a region outside the aperture 2a. The aluminum foil 5 extends longitudinally along the length of the glass tube 2 and has opposite ends disposed in the vicinity of respective opposite ends of the glass tube 2. The copper foil 6 is bonded by an electrically conductive adhesive to the upper surface of the aluminum foil 5 fixed to the outer peripheral surface of the glass tube 2. More specifically, the copper foil 6 is bonded to the outer surface of the aluminum foil 5 by an electrically conductive adhesive in such a manner that the copper foil 6, like the aluminum foil 5, extends longitudinally along the length of the glass tube 2 and has opposite ends disposed in the vicinity of respective opposite ends of the glass tube 2.

With this arrangement, the aluminum foil 5 and the copper foil 6 are integral with each other on the outer peripheral surface of the glass tube 2 to thereby provide the third electrode in the form of an arcuate plate. The width of the copper foil 6 is about one fourth that of the aluminum foil 5. The cost is reduced by this reduced width of the copper foil 6. The third electrode is covered by an electrically insulative coating 7 except for its opposite ends.

The third electronic is connected to one of the pair of opposed electrodes (electrode portions) 3 and serves as an electrode of the same potential as the electrode portion 3 More specifically, the electrode wire 32 of the electrode portion 3 is connected to one end of the copper foil 6, and a lead wire 33 is connected to the other end of the copper foil 6. With this arrangement, the copper foil 6 (and hence the third electrode) and the electrode portion 3 connected thereto are at the same electric potential, and the lead wire 33 connected to the copper foil 6 serves as a lead wire for these electrodes. The opposite ends of the copper foil 6 are covered by an electrically insulative tape 8 after the above electrical connections have been made.

A lead wire 33' is connected to the electrode wire 32 of the other electrode portion 3 (i.e., that electrode portion 3 which is not connected to the copper foil 6), and the junction between the lead wire 33' and the electrode wire 32 is covered by a sheath tube 34. The lead wire 33' and the wire 33 connected to the third electrode are covered and tied together by a sheath tube 34'.

With the above construction, the distance between the electrode portions 3, which are provided respectively at the opposite ends of the glass tube 2 to form the pair of opposed electrodes, is reduced by the third electrode. Therefore, even when the fluorescent lamp 1 is at a low temperature, a discharge is triggered from the third electrode to induce an adequate discharge between the opposed electrodes without increasing the voltage applied to the electrodes. Thus, the starting ability of the lamp at low temperatures is improved.

Conventionally, when the electrode wires extending from the opposite ends of the fluorescent lamp are not accurately tied together, the path of light is often interrupted. With the fluorescent lamp shown in FIG. 1, however, the lead wires 33 and 33' are led out at one end of the fluorescent lamp and tied together neatly. Therefore, the extension of the lead wires from the end of the fluorescent lamp can be arranged in a compact manner, and as a result these wires can be mounted easily and with less interference with other parts.

In this embodiment, although the third electrode is composed of aluminum foil of a greater width and a copper foil of a smaller width, the third electrode is not restricted to such an construction and suitable modifications can be made. For example, the third electrode may be made of a single metal foil of high electrical conductivity, such as gold leaf, adhesively bonded or vapor-deposited onto the glass tube 2.

Also, although the third electrode is formed on the outer peripheral surface of the glass tube 2, suitable modifications can be made in this respect. For example, the third electrode may be formed by an electrically conductive material, such as aluminum, vapor-deposited on the inner surface of the glass tube 2, in which case the fluorescent layer 4 is formed on the vapor-deposited electrically conductive material. Another example of a suitable modification is to form the glass tube from laminated glass with the third electrode formed between laminations.

Further, the area of the third electrode is not restricted to the illustrated embodiment and suitable modifications can be made in this respect too. For example, the third electrode may be formed over the entire peripheral surface of the glass tube 2 except for the portion where the aperture 2a is provided.

As described above, according to the present invention, the distance between the opposed electrodes is reduced by the third electrode disposed between the opposed electrodes, and as a result the starting ability of the lamp can be improved at low temperatures without increasing the voltage applied between the electrodes.

What is claimed is:

1. A fluorescent lamp comprising: a glass tube, a gas under a low pressure sealed in said glass tube; first and second electrodes mounted at respective opposite ends of said glass tube; a fluorescent material provided on an inner surface of said glass tube, said fluorescent material being caused to emit light by a discharge between said first and second electrodes; and a third electrode provided between said first and second electrodes, said third electrode being connected to said first electrode, wherein said third electrode comprises a layer of aluminum bonded to an outer surface of said glass tube in a region excluding a light-applying aperture of said tube, and a layer of copper bonded to an outer surface of said layer of aluminum.

2. The fluorescent lamp according to claim 1, wherein a width of said layer of copper is less than a width of said layer of aluminum.

3. The fluorescent lamp according to claim 2, wherein said width of said layer of copper is approximately one-fourth that of said layer of aluminum.

4. The fluorescent lamp according to claim 1, further comprising an insulating layer covering said third electrode.

5. The fluorescent lamp according to claim 1, wherein said third electrode comprises a single layer of a highly conductive material.

6. The fluorescent lamp according to claim 5, wherein said highly conductive material comprises gold leaf.

7. The fluorescent lamp according to claim 1, wherein said third electrode comprises a layer of aluminum vapor-deposited on an inner surface of said glass tube.

8. The fluorescent lamp according to claim 4, wherein said glass tube comprises a plurality of laminated layers of glass, and wherein said third electrode is formed between said laminated layers, one of said layers constituting said insulating layer.

*9. A fluorescent lamp, comprising:*

*a glass tube having an axis, inner and outer surfaces, and first and second ends;*

*a gas under a low pressure in said glass tube;*

*a fluorescent material provided on said inner surface of said glass tube;*

*at least two electrodes being mounted to said glass tube;*

*at least one of said at least two electrodes extending axially along the axis of said glass tube and being mounted on the outer surface of said glass tube, said fluorescent material being caused to emit light by a*

*discharge between said at least two electrodes;*

*a first wire connected to said axially extending electrode at said first end of said glass tube; and*

*a second wire connected to another of said at least two electrodes at said first end of said glass tube;*

*wherein power is supplied to said fluorescent lamp only through said first and second wires at said first end of said glass tube.*

*10. The fluorescent lamp according to claim 9, wherein said at least one electrode which extends axially along the axis of said glass tube is at least partially covered by a coating.*

*11. The fluorescent lamp according to claim 10, wherein said coating is made of an electrically insulating material.*

*12. The fluorescent lamp according to claim 9, furthereb comprising a third electrode mounted at said second end of said glass tube.*

*13. The fluorescent lamp according to claim 12, further comprising a third wire being connected between said third electrode and said axially extending electrode along the axis of said glass tube.*

* * * * *

UNITED STATES PATENT AND TRADEMARK OFFICE

CERTIFICATE OF CORRECTION

PATENT NO. : Re. 35,142

DATED : January 9, 1996

INVENTOR(S) : R. KIKUCHI et al.

It is certified that error appears in the above-indentified patent and that said Letters Patent is hereby corrected as shown below:

At column 6, line 3 (claim 12, line 1), change "furthereb" to ---further---.

Signed and Sealed this

Seventeenth Day of December, 1996

*Attest:*

*Attesting Officer*

BRUCE LEHMAN

*Commissioner of Patents and Trademarks*